United States Patent [19]

Scholz et al.

[11] 4,070,695

[45] Jan. 24, 1978

[54] CIRCUIT FOR SIMULTANEOUS DISPLAY OF SEPARATELY BROADCAST VIDEO SIGNALS

[75] Inventors: Artur Scholz, Braeunlingen; Dennis Cota, VS-Villingen, both of Germany

[73] Assignee: Saba Schwarzwaelder Apparate-Bau-Anstalt August Schwer Soehne GmbH, Villingen, Germany

[21] Appl. No.: 771,903

[22] Filed: Feb. 25, 1977

[30] Foreign Application Priority Data

Apr. 2, 1976    Germany ............................ 2614199

[51] Int. Cl.² ............................................. H04N 5/68

[52] U.S. Cl. .................................. 358/181; 358/142; 358/183

[58] Field of Search ................ 358/142, 181, 182, 183

[56] References Cited

U.S. PATENT DOCUMENTS 3,849,594   11/1974   Justice ............................. 358/142 X Primary Examiner—Robert L. Richardson
Attorney, Agent, or Firm—Norman J. O'Malley; Theodore D. Lindgren; Robert T. Orner

[57] ABSTRACT

A circuit system for a television receiver, said system operating to replace a changing quadrant of the picture of a main transmitted program with an equivalent-size sector of a second transmitted program.

8 Claims, 4 Drawing Figures

CIRCUIT FOR SIMULTANEOUS DISPLAY OF SEPARATELY BROADCAST VIDEO SIGNALS

BACKGROUND OF THE INVENTION

The present invention concerns a circuit system for a television receiver on which a first transmitted program is reproduced and including means by which at least a portion of the picture of a second transmitted program is made simultaneously visible replacing a portion of the initially reproduced program.

Prior art television receivers in which more than one program can be viewed simultaneously have been constructed with an additional smaller television screen being placed adjacently to the main screen. However, that method of construction is very expensive because it requires a complete duplication of parts, including the television picture tube.

A method for elimination of the additional television tube has been accomplished in television studios where the co-joining or mixing of at least one part of an additional television picture into a blanked sector of the main picture is common practice. However, the method of combining a plurality of television images taken by different in-station television cameras and reproduced together on the same receiver screen is simplified by the fact that the deflection signals for the different television camera tubes have identical timing. Thus, the method is limited to television studio systems operating under closed-circuit conditions. The same limitation also applies to known methods for the simultaneous showing of several video signals originating from different in-station television cameras in which different sawtooth signals are applied to the different television cameras, but where the frequencies of the signals are related to each other by integral fraction.

The simultaneous reproduction of television picture signals beamed by various television stations onto one television receiver screen has been accomplished by the blending of a reduced image of a second program into the televised picture of the main program. However, that method requires memory capability for the purpose of reducing the size of the picture of the second program and for the purpose of overcoming the difference in time between the synchronizing signals broadcast by the two stations. The size reduction of the picture of the second program has been achieved by designing the output speed for the memory to be greater than the input speed and by limiting reproduction to only every fourteenth line of the second program. The reduced picture consequently has a diminished resolution in the vertical direction.

SUMMARY OF THE INVENTION

The present invention utilizes a television receiver circuit system which operates without the previously described memory and associated circuitry. This invention is based on the fact that it is often sufficient to replace part of the picture of the main program with a mere part of the picture of the second program, since the viewer wishes merely to be informed as to whether the second program is of interest to him or her or whether is has already begun. This can be readily accomplished by viewing merely a sector of the picture transmitted for the second program. The circuit system of this invention replaces a quadrant of the picture of the main program with a sector of the picture of the second program. The sector of the second picture is not reduced in size, nor is the resolution changed. Both the remaining part of the main picture and the sector of the second picture are displayed exactly as broadcast.

Accordingly, the present invention provides a television receiver with a picture screen on which a first program is televised, said television receiver having a circuit system by means of which at least a segment of a second transmitted video signal is made visible simultaneously, said segment replacing a segment of the simultaneously broadcast first transmitted video signal. Said circuit system includes a means for receiving, tuning and amplifying the video signals at intermediate frequency, a means for extracting from each signal the respective horizontal-frequency and vertical-frequency synchronizing pulses. The phase positions of the respective sync signals from each transmitter are compared by a phase-comparison means, said phase-comparison means providing a bi-level switching signal with timing dependent on the relative phase position of both the horizontal and the vertical synchronizing pulses. The phase-comparison means chooses a rectangular portion of the picture of the second program to replace an equivalent size rectangular quadrant of the main program. The quadrant of the main program is continually re-selected to be free from synchronizing pulses of the second program. The bi-level ouput signal of the phase-comparison means is used to drive a switching means which alternately transmits first and second picture signals to the video-display means.

BRIEF DESCIPTION OF THE DRAWINGS

Figure 4:
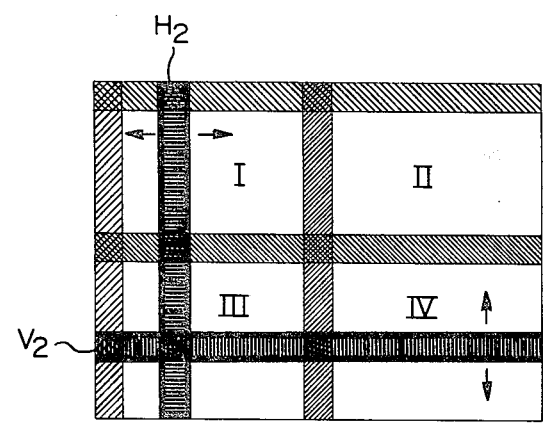

FIG. 4 indicates a picture frame divided into sectors for the purpose of explanation of the circuit system of this invention.

DESCRIPTION OF THE PREFERRED EMBODIMENTS

The present invention is based on the fact that transmitters using standard color television signals for the NTSC and PAL systems transmit a video signal which has fixed ratios between the horizontal and vertical scanning frequencies and the color sub-carrier frequency. Since the frequency of the color sub-carrier is required to have an accuracy on the order of $10^{-6}$, a very close agreement between the horizontal and vertical scanning frequencies from transmitter to transmitter is ensured. It is therefore possible to mix the video information of a transmitter A with that of a transmitter B, or to co-join the information of transmitter B with the information of transmitter A. However, due to very slight differences of frequency, the synchronizing pulses of transmitter B are generally shifting in phase with respect to the synchronizing pulses of transmitter A, and this phase shift results in the picture of transmitter B slowly shifting its position in relation to the picture of transmitter A. In addition, a fixed or non-time-varying phase displacement between the received synchronizing pulses of two transmitters may also result from relative geographical distances between the receiver and the transmitters. The synchronizing and blanking pulses contained in the video information of transmitter B, when super-imposed on a signal displayed from transmitter A, show themselves as broad black horizontal and vertical bars which move vertically and laterally as the phase of the two signals shift with respect to each other. If the screen is divided into four sectors, I, II, III, and IV, it will be seen from FIG. 4 that at any instant one sector of the picture from transmitter A is always free from the moving broad black horizontal and vertical bars caused by the shifting phase of the blanking pulses of transmitter B. The circuit system of the present invention automatically selects this bar-free sector and reproduces therein a part of the picture transmitted from transmitter B.

Figure 1:
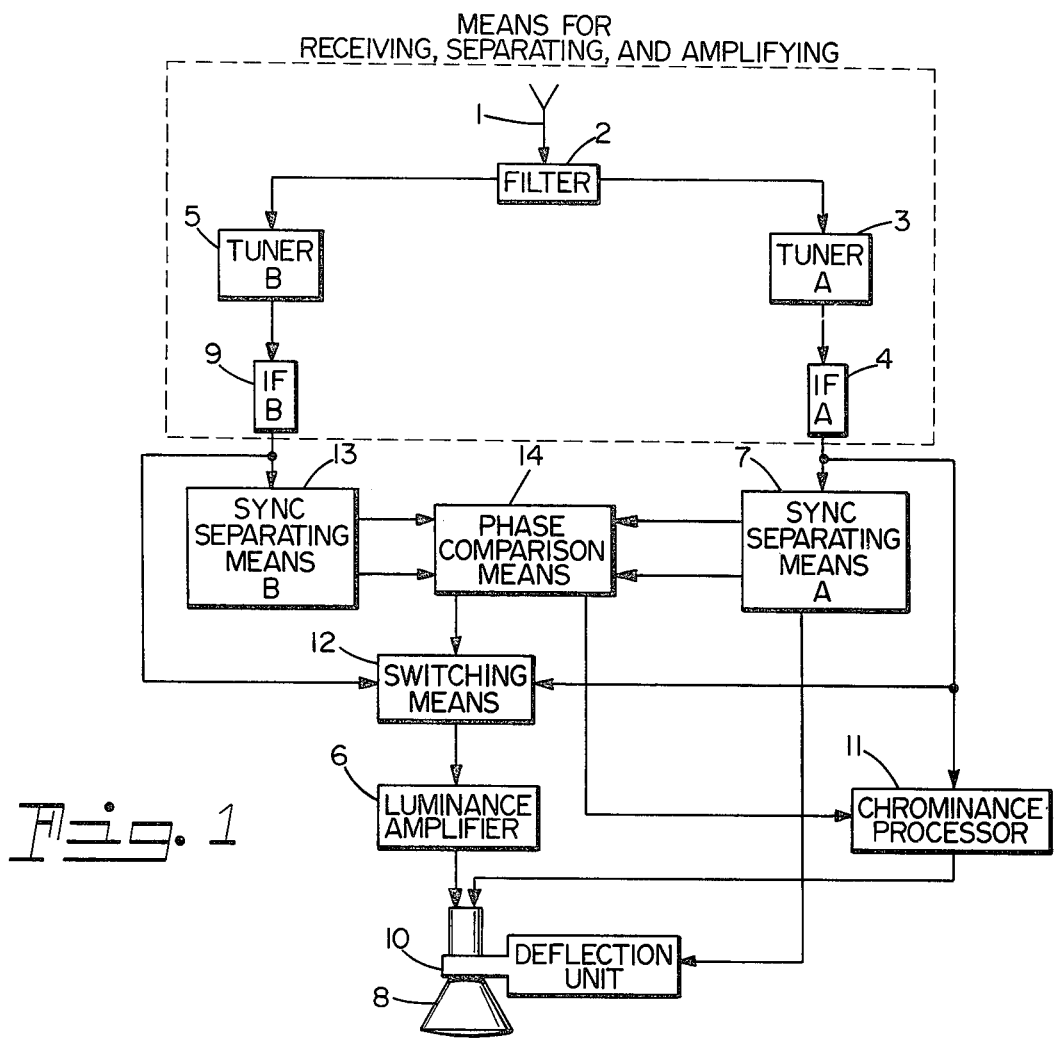
FIG. 1 is a block diagram of the circuit system of this invention.

In the circuit system of FIG. 1, the television video signals of first and second transmitters, A and B, pass through means for receiving, tuning and amplifying said signals at intermediate frequency. Said means may include an antenna 1 connected to antenna filter 2, which in turn is connected to two intermediate frequency amplifiers 4 and 9 through separate tuners 3 and 5. It is assumed here that tuner 3 is tuned to transmitter A and tuner 5 is tuned to transmitter B. The signal from transmitter A is processed and reproduced on the picture tube 8 as the first or main program. The signal is processed in the usual manner through an IF amplifier 4 from which it passes through switching means 12, described later, to a video-display means comprised of luminance amplifier 6, television tube 8 and deflection unit 10. The synchronizing pulses from transmitter A are simultaneously processed in the sync-separating means 7 from which the deflection signals for the deflection unit 10 are obtained. In the circuit system of a color television receiver, the color signals pass through chrominance processor 11. The additional program from transmitter B is received by tuner 5, then processed through IF amplifier 9 from which it passes to the luminance amplifier 6 via switching means 12 to which the other program is also connected. In addition, the transmitter B signal of IF amplifier 9 is applied to sync-separating means 13 which delivers the horizontal frequency and vertical frequency synchronizing pulses to phase-comparison means 14, said pulses being compared with the transmitter A vertical-frequency and horizontal-frequency synchronizing pulses from the sync-separating means 7. The phase-comparison means 14 causes switching means 12 to operate dependent on the relative phase position of the synchronizing pulses, so that a part of the picture from the signal of transmitter B appears on the screen of the television tube 8. Switching means 12 thus transmits to luminance amplifier 6 that part of the picture transmitted by transmitter B which is free from horizontal and vertical synchronizing and blanking pulses. Where used in a color television receiver, the chrominance processor 11 may be blocked by a blocking pulse which inhibits processor 11 during display of the part of the picture from transmitter B. The circuit system of this invention may, of course, also be used with a black and white television receiver, in which case chrominance processor 11 is eliminated from the circuit system indicated in FIG. 1.

Figure 2:
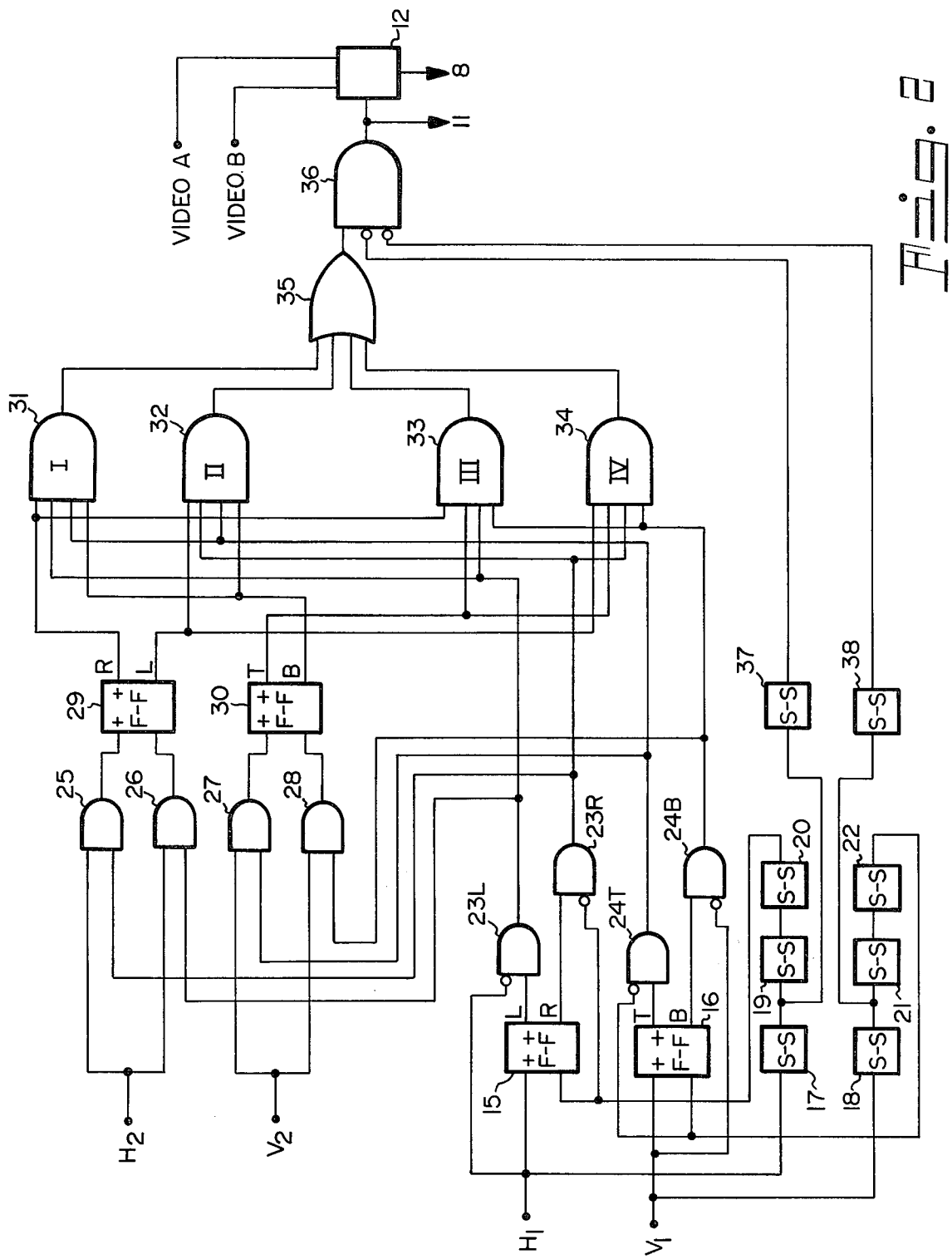
FIG. 2 is a detailed block diagram of a phase-comparison means for use in the circuit system of the present invention.

One embodiment of phase-comparison means 14 and production of the bi-level signal required for operation of switching means 12 will now be described with reference to FIG. 2 and FIG. 3.

The transmitter A horizontal-synchronizing pulses $H_1$ and vertical-synchronizing pulses $V_1$ from sync-separating means 7 of the receiver arrive at the inputs of frequency-dividing bi-stable flip-flops 15 and 16, causing them to switch to a first state for start of the horizontal or the vertical sweep. The flip-flops shown are those in which a positive pulse on one input switches the indicated output to a positive potential and a positive pulse on the other input switches the other output to a positive potential. Simultaneously, half-sweep one-shot multivibrator 17 or 18 is triggered. Multivibrators 17 and 18 are timed such that the electron beam, after said one-shot multivibrators switch back, has not reached the center of the picture either in the horizontal or in the vertical direction. Center-blanking-triggering one-shot multivibrators 19 and 20 and half-sweep-pulsing one-shot multivibrators 21 and 22 are connected in tandem pairs to one-shot multivibrators 17 and 18 and, during operation, switch the output of flip-flops 15 and 16 to a second state after a half-sweep delay determined by the one-shot multivibrators 17 and 19 as well as 18 and 21. The outputs of flip-flops 15 and 16 are passed through AND gates 23L, 23R, 24T and 24B. The outputs of AND gates 23L, 23R, 24T and 24B are inhibited by $H_1$, output of multivibrator 20, output of multivibrator 22 and $V_1$ respectively. The effect of said inhibited AND gates is to delay the leading edge of the output of flip-flops 15 and 16 by the duration of the synchronizing pulses $H_1$ and $V_1$ or by the length of the pulse output of one-shot multivibrators 20 and 22. One-shot multivibrators 20 and 22 have pulse lengths substantially equal to the lengths of pulses $H_1$ and $V_1$. The time delays, which could also be accomplished by use of exclusive OR gates, are necessary in order to produce stable switching conditions in the center of the respective horizontal and vertical sweeps as well as at the top and left side of the picture. The outputs of the AND gates 23L and 23R are then compared with the synchronizing pulses $H_2$ of the television signal from transmitter B, said outputs and pulses being applied to horizontal-comparison AND gates 25 and 26. Similarly, the outputs of AND gates 24T and 24B are compared with the synchronizing pulses $V_2$ at the inputs of vertical-comparison AND gates 27 and 28. The outputs of AND gates 25, 26, 27, and 28 are applied to respective inputs of horizontal-locking bi-stable flip-flop 29 and vertical-locking bi-stable flip-flop 30. Flip-flop 29 has first and second outputs 29R and 29L. Flip-flop 30 has first and second outputs 30T and 30B. The bi-stable flip-flops 15, 16, 29 and 30 are connected to first-, second-, third-, and fourth-quadrant-comparison AND gates 31, 32, 33 and 34. The flip-flop outputs 29R, 15L, 16T and 30B are connected to the inputs of AND gate 31. The flip-flop outputs 29L, 15R, 16T and 30B are connected to the inputs of AND gate 32. The flip-flop outputs 29R, 30T, 15L and 16B lead to the input of AND gate 33. The flip-flop outputs 29L, 30T, 15R and 16B lead to the inputs of AND gate 34. The outputs of AND gates 31, 32, 33 and 34 are applied through switch-sequencing OR gate 35, then to optional AND gate 36, the bi-level output of which is normally at a first level, changing to its second level only during times during which the simultaneous requirements of each of AND circuits 31, 32, 33 and 34 are met. AND gate 36 is inhibited by a signal from either or both of one-shot multivibrators 37 and 38. Thus AND gate 36 is opened only when all of the following conditions are met:
 a. The electron beam is in the proper quadrant.
 b. No horizontal blanking pulse is applied.
 c. No vertical blanking pulse is applied.
 d. The electron beam is not near the center of a line.

e. The electron beam is not near the center of the vertical scan.

The bi-level output of AND gate 36 remains at its first level during the middle of the picture scan both in a horizontal and a vertical direction because of inhibiting pulses which are produced by one-shot multivibrators 37 and 38. One-shot multivibrators 37 and 38 are triggered by the outputs of one-shot multivibrators 17 and 18. The pulse lengths of multivibrators 37 and 38 extend across the center of the corresponding horizontal and vertical deflection sweep signals. The bi-level signal taken from AND gate 36 is of such duration and phase that it operates switching means 12 to interrupt the video signal of the main program with correct timing. That is, during the "bar-free" sector of the television field switching means 12 links the signal of the second program B to the video display means rather than linking the signal of the first program to said video display means. However, replacement of the first program by the second program is prevented during passage of the electron beam through the hatched area of FIG. 4. That is, the switching can take place only in the parts of sectors I, II, III or IV which are not hatched. During operation, AND gate 36 may also switch off the chrominance processor 11 so that color errors caused by a different color frequency for program 8 are avoided.

The operation of the phase-comparison means 14 shown in FIG. 2 may be illustrated with reference to the pulse diagrams indicated in FIG. 3. For example, in FIG. 4 it is assumed that the phase position of the horizontal and vertical synchronizing pulses $V_2$ and $H_2$ of the second television signal are disposed in the bottom and left parts of the raster of the first television signal. For illustration purposes, the screen is divided into four quadrants, I, II, III, and IV. As may be seen, only the quadrant II is free of synchronizing pulses $H_2$ and $V_2$. The first synchronizing pulse $H_1$ places the output of the bi-stable flip-flop 15 in the switching condition indicated in FIG. 3 for the horizontal frequency pulse. If, as is assumed, a synchronizing pulse $H_2$ occurs during the first line half, it is compared at AND gates 25 and 26 with the outputs of flip-flop 15 as said outputs are delayed by inhibiting AND gates 23L and 23R. In the first line half the output of AND gate 23L is high and the output of AND gate 23R is low. Therefore, in the first line half, the AND conditions for AND gate 26 are fulfilled by the pulse $H_2$ causing flip-flop 29 to initially switch to the condition such that output 29L is high and output 29R is low. The outputs of flip-flop 29 remain constant so long as pulse $H_2$ occurs during the left half of the electron beam sweep. Through identical reasoning, it may be shown that flip-flop output 30B is high so long as pulse $V_2$ occurs in the top half of the vertical beam sweep.

Figure 3:
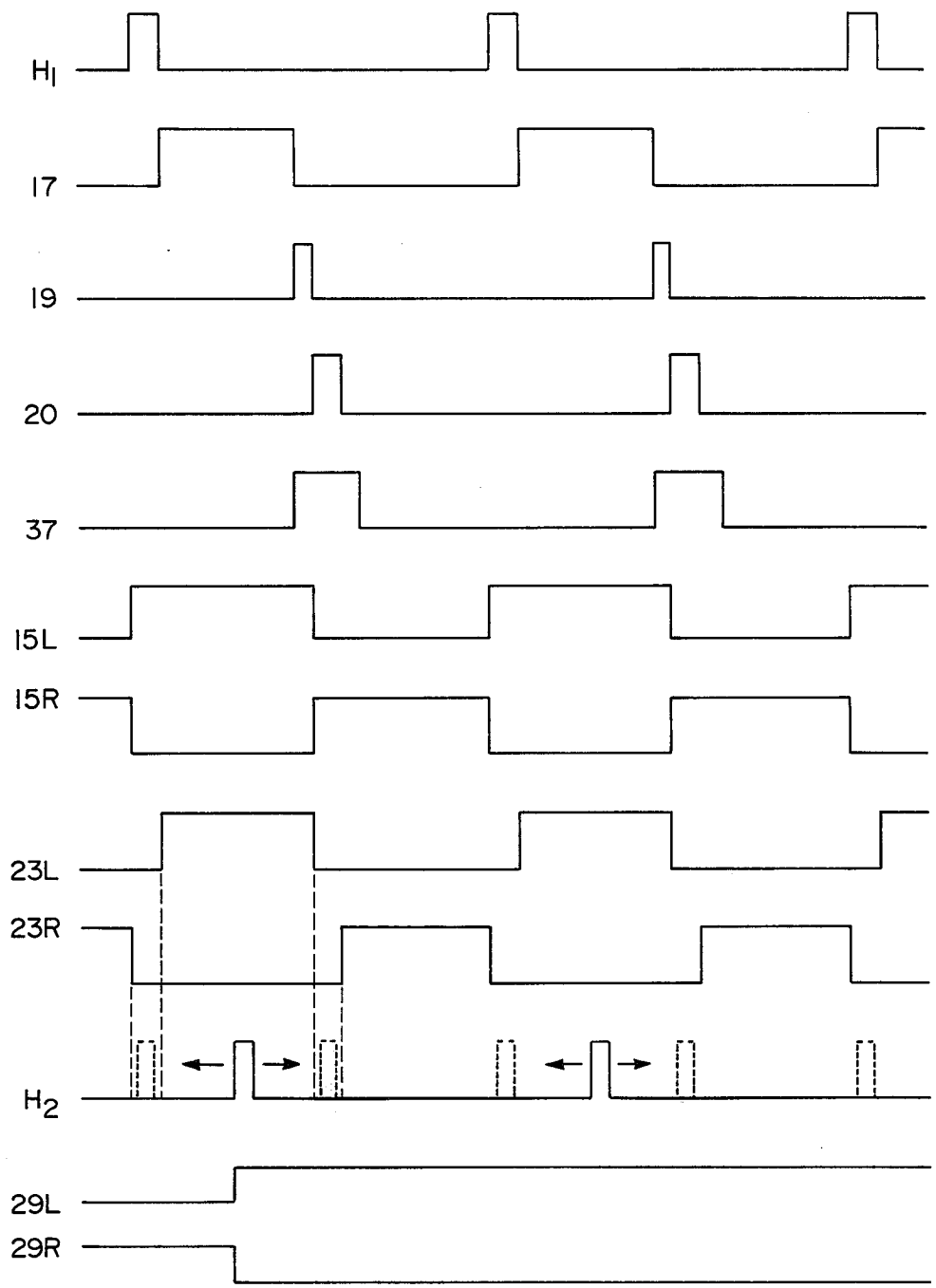
FIG. 3 is a pulse diagram for use in explaining operation of the phase-comparison means of FIG. 2.

When the electron beam reaches sector II during its horizontal sweep, flip-flop 15, as indicated in the diagram of FIG. 3, is switched by one-shot multivibrator 20 while flip-flop output 29L remains in its high state. Switching of flip-flop 15 continues during each horizontal sweep of the beam. The switching conditions of the outputs of flip-flops 29, 30, 15 and 16 are compared with each other in AND gates 31, 32, 33 and 34. In the quadrant II example illustrated, only the AND conditions for AND gate 32 are fulfilled. The AND conditions for AND gates 31, 32, 33 and 34 are each fulfilled only during the absence of transmitter B synchronizing pulses from those quadrants and during the presence of the electron beam in those quadrants. The operation results in the fact that the switching means 12 is changed over only during a completely defined switching time. The control signal from AND gates 31, 32, 33 and 34 is transmitted via OR gate 35 and AND gate 36 to the switching means 12 which, in the proper quadrant, alternately links the video signal of transmitter A and the video signal of the transmitter B with the video display means. As soon as the transmitter B synchronizing pulses migrate into another quadrant and begin to be visible there, another AND condition for either gate 31, 32, 33, or 34 is fulfilled so that the video signal of transmitter B replaces that of transmitter A in another quadrant of the picture. The AND circuits consequently represent the time control for program switching and determine at what moment the signal of transmitter A is to be replaced by the signal of transmitter B at the input to the video display means.

Since, as is well known, the horizontal synchronizing pulses are narrower than the blanking pulses because of front and back porches, the front or rear of the moving vertical bar of FIG. 4 will project at times into the picture of the bar-free quadrant. It is necessary to avoid this and to ensure that a stable changeover from quadrant to quadrant can take place not only when the synchronizing and blanking pulses from the two transmitters coincide but also when the pulses occur at half-intervals. These objects are achieved by causing AND gates 23L and 23R to be inhibited by the synchronizing pulse of transmitter A or by the synchronizing pulse of the same duration produced by the one-shot multivibrator 20, the latter having been delayed by one-shot multivibrators 17 and 19. A similar result is obtained for the vertical synchronizing pulses by inhibiting AND gates 24T and 24B by the vertical synchronizing pulse $V_1$ or by the artificially developed synchronizing pulse of one-shot multivibrator 22.

When the blanking intervals of transmitter B are precisely between two quadrants, switching means 12 may not receive precise information concerning the proper quadrant location. In order to avoid this problem, the synchronizing pulses from transmitter B may be made somewhat shorter than those of transmitter A. For example, the transmitter A pulses might include front and back porches of that signal. The resultant effect is to produce a slight delay in switching between the quadrants. Thus the synchronizing pulse information of transmitter B disappears between quadrants and switching is controlled by the synchronizing pulses of transmitter A. Since the position of the transmitter B picture is stored in flip-flops 15, 16, 29 and 30, a particular condition is maintained until blanking pulses definitely appear in another quadrant. At that time, comparison between the synchronizing pulses resumes and switching means 12 operates in the new bar-free quadrant.

The pulses shown in FIG. 3 apply to the horizontal scanning of the electron beam. Similar conditions occur for the pulses in the vertical scanning direction. The color sub-carrier signals radiated by the transmitters have a standardized tolerance of ±10Hz for both NTSC and PAL specifications. Since the horizontal and vertical synchronizing pulse frequencies are rigidly coupled, fractional sub-harmonies of the frequencies of the color sub-carriers, and since the horizontal and vertical frequencies are much smaller in value, they coincide with much greater accuracy than the ±20Hz tolerance between station color sub-carriers. However, in general, a slight difference in the synchronizing pulse frequencies of two broadcast transmitters will always be present. In the present invention the slight difference is regarded as an advantage, because the resulting phase change not only causes shifting of the sector of the second picture from quadrant to quadrant of the main picture but also causes all parts of the second picture to be periodically seen by the viewer, thus considerably increasing viewer information concerning the content of the second program.

While a particular embodiment of the present invention has been described and shown, it will be obvious to those who are skilled in the art to which the invention pertains that changes and modifications may be made without departing from the spirit and scope of the invention as set forth in the appended claims. More specifically, it is well known that equivalent logic functions may be obtained by interchanging AND gates and OR gates with appropriate input inhibitions and output inversions. For example, the function of inhibited AND gates 23L, 23R, 24T and 24B could be performed by inhibited NOR gates wherein the outputs of flip-flops 15 and 16 are inhibited.

What we claim is:

1. A circuit system for a television receiver wherein a quadrant of a first transmitted video signal is replaced by a sector of a second transmitted video signal comprising:
   means for receiving, separating and amplifying at intermediate frequencies a first and a second transmitted video signal;
   sync-separating means for separately extracting the vertical and the horizontal synchronizing pulses from said first and second transmitted video signals;
   phase-comparison means for processing said vertical and horizontal pulses to provide a bi-level switching signal in which a second level is activated only during time periods corresponding to transmission of a quadrant of said second transmitted video signal, said time periods coinciding with time periods during which no synchronous pulses occur during transmission of said first transmitted video signal;
   video display means; and
   switching means responsive to said bi-level switching signal, said switching means linking said second transmitted video signal to said video display means during activation by said second level of said switching signal and linking said first transmitted video signal to said video display means during activation by the first level of said switching signal.

2. The circuit system of claim 1 in which said first transmitted video signal is connected to a chrominance processor after amplification at intermediate frequency, the output of said chrominance processor being transmitted to said video display means.

3. The circuit system of claim 2 in which said chrominance processor is inhibited by blocking pulses transmitted from the output of said phase-comparison means during said first-level activation of said bi-level signal.

4. The circuit system of claim 1 in which said phase-comparison means further comprises:
   a horizontal-and a vertical-frequency-dividing bi-stable flip-flop, one input of each of said dividing flip-flops connected respectively to said horizontal and vertical synchronizing pulses of said first transmitted video signal, the second input of each of said dividing flip-flops connected respectively to the outputs of half-sweep-pulsing one-shot multivibrators, the inputs of said pulsing multivibrators connected to outputs of half-sweep-delay one-shot multivibrators, the inputs of said delay multivibrators connected respectively to said horizontal and vertical synchronizing pulses of said first transmitted video signal;
   two horizontal-comparison AND gates, one input of each of said horizontal-comparison gates connected to said horizontal synchronizing pulses of said second transmitted video signal, the second input of each of said horizontal-comparison gates connected to opposite outputs of said horizontal-frequency-dividing flip-flop;
   two vertical-comparison AND gates, one input of each of said vertical-comparison gates connected to said vertical synchronizing pulses of said second transmitted video signal, the second input of said vertical-comparison gates connected to opposite outputs of said vertical-frequency-dividing flip-flop;
   a horizontal-locking bi-stable flip-flop, each input of said horizontal-locking flip-flop connected to the output of one of said horizontal-comparison AND gates;
   a vertical-locking bi-stable flip-flop, each input of said vertical-locking flip-flop connected to the output of one of said vertical-comparison AND gates;
   a first-quadrant-comparison AND gate, the four inputs of said first-quadrant-comparison gate connected respectively to a first output of said horizontal-locking flip-flop, to a second output of said vertical-locking flip-flop, to a first output of said horizontal-frequency-dividing flip-flop and to a first output of said vertical-frequency-dividing flip-flop;
   a second-quadrant-comparison AND gate, the four inputs of said second-quadrant-comparison gate connected respectively to a second output of said horizontal-locking flip-flop, to a second output of said vertical-locking flip-flop, to a second output of said horizontal-frequency-dividing flip-flop and to a first output of said vertical-frequency-dividing flip-flop;
   a third-quadrant-comparison AND gate, the four inputs of said third-quadrant-comparison gate connected respectively to a first output of said horizontal-locking flip-flop, to a first output of said vertical-locking flip-flop, to a first output of said horizontal-frequency-dividing flip-flop and to a second output of said vertical-frequency-dividing flip-flop;
   a fourth-quadrant-comparison AND gate, the four inputs of said fourth-quadrant-comparison gate connected respectively to a second output of said horizontal-locking flip-flop, to a first output of said vertical-locking flip-flop, to a second output of said horizontal-frequency-dividing flip-flop and to a second output of said vertical-frequency-dividing flip-flop; and
   a switch-sequencing OR gate, the four inputs of said switch-sequencing gate connected respectively to the outputs of said first-, second-, third- and fourth-quadrant-comparison gates, the output of which is connected to said switch means.

5. The circuit system of claim 4 in which the switched outputs of said frequency-dividing bi-stable flip-flops are time-delayed by transmission of said outputs through inhibiting AND gates, said inhibiting AND gates inhibited by respective switching inputs to said flip-flops, said half-sweep pulsing one-shot multivibrator outputs having pulse lengths substantially equal to horizontal and vertical pulse lengths respectively.

6. The circuit system of claim 4 in which the output of said switch-sequencing OR gate is transmitted through an inhibiting AND gate, said inhibiting AND gate being inhibited by impulses from blanking one-shot multivibrator outputs, the impulses of said blanking one-shot multivibrators beginning prior to the respective impulses of said secondary one-shot multivibrator and ending after said respective impulses, the input of said blanking one-shot multivibrators being triggered by a center-blanking triggering one-shot multivibrator.

7. The circuit system of claim 4 in which the switched outputs of said frequency-dividing bi-stable flip-flops are time-delayed by transmission of said outputs through inhibiting NOR gates, one input of each of said inhibiting NOR gates connected to the respective switching inputs to said flip-flops and the second inhibiting input of each of said NOR gates connected to the respective outputs of said flip-flops, said half-sweep pulsing one-shot multivibrator outputs having pulse lengths substantially equal to horizontal and vertical pulse lengths respectively.

8. The circuit system of claim 4 in which the switched outputs of said frequency-dividing bi-stable flip-flops are time-delayed by transmission of said outputs through exclusive OR gates, one input of each of said exclusive OR gates connected to the respective switching input to said flip-flops and the second input of each of said exclusive OR gates connected to the respective outputs of said flip-flop, said half-sweep pulsing one-shot multivibrator outputs having pulse lengths substantially equal to horizontal and vertical pulse lengths respectively.

* * * * *